United States Patent Office 3,577,548
Patented May 4, 1971

3,577,548
METHODS FOR STERILIZING INSECTS WITH TRIARYLTIN COMPOUNDS
Eugene E. Kenaga, Midland, Mich., assignor to The Dow Chemical Company, Midland, Mich.
No Drawing. Continuation-in-part of application Ser. No. 244,917, Dec. 17, 1962. This application Dec. 31, 1964, Ser. No. 422,554
Int. Cl. A01n 9/22, 9/00
U.S. Cl. 424—288
25 Claims

ABSTRACT OF THE DISCLOSURE

Methods for administering to an animal a minimal sterilant amount of a triaryltin compound of the group of

and

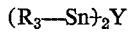

wherein, in all of its occurrences in any given triaryltin compound, R represents the same member selected from the group consisting of phenyl, mono-substituted phenyl wherein the substituent is a member selected from the group consisting of halo, loweralkyl, and loweralkoxy; Z represents a monovalent moiety selected from the group consisting of (phenylloweralkyl), alkenyl, alkadienyl, cycloalkenyl, cycloalkadienyl, halo, hydroxy, mercapto, hydrogen, alkanoate, alkenoate, loweralkoxy, loweralkylthio, diloweralkylcarbamate, diloweralkylthiocarbamate, diloweralkyldithiocarbamate, radical of the formula

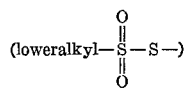

radical of the formula

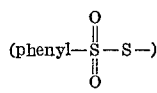

and radical of the formula —Sn—R$_3$; and Y represents a divalent moiety selected from the group consisting of —O—, —S—, methylene, ethylene, ethynylene,

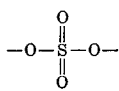

carbonyl, 1,3-butadien-1,4-ylene, and

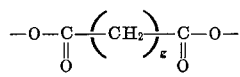

wherein g is an integer of from 1 to 10, both inclusive.

---

This is a continuation-in-part of my copending application Ser. No. 244,917, filed Dec. 17, 1962, now abandoned.

The present invention is concerned with reproductive sterilants to inhibit the reproduction of living animal organisms of a wide variety.

According to the present invention, it has been discovered that the power of gamic reproduction of an animal organism that normally reproduces gamically (hereinafter called "animal") can be inhibited without apparent other effect upon the organism by the administration to the said organism of a minimal sterilant amount of a triaryltin compound.

It has been further discovered that since a minimal sterilant dose of one or more of the present agents does not reduce vitality and activity of the sterilized animal, the practice of the present invention can often be employed to control the numbers of animals comprising a species population. In this practice, sterilization of an animal in the manner of the present invention is carried out, and the sterilized animal is thereafter permitted to mate. The number of occurrences of matings of sterilized animals necessary to effect control, to the desired extent, of numbers of a population will depend upon such factors as the size of the population, reproductive habits, and the like; but in any case, the step of permitting mating of a sterilized animal with a fellow member, whether itself sterilized or unsterilized, of a population effects population numbers control to at least some extent.

The inhibition of gamic reproduction is effected by administering to an animal a minimal sterilant amount of a triaryltin compound selected from the group consisting of

and

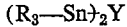

The control of a species population is effected by administering to an individual member of the species population a minimal sterilant amount of a triaryltin compound, as hereinbefore defined, and thereafter permitting the resulting sterilized individual member to mate with another individual member of the species population. In the present specification and claims, the term "triaryltin compound" is used to designate one or more products of these formulae, hereinbefore, only.

In the above and succeeding formulae, in all of its occurrences in any given triaryltin compound, R represents the same member selected from the group consisting of phenyl, mono-substituted phenyl wherein the substituent is a member selected from the group consisting of halo, loweralkyl, and loweralkoxy; Z represents a monovalent solubilizing moiety; and Y represents a divalent solubilizing moiety.

That moiety of the triaryltin compound which is of the formula

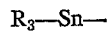

is the functional group which is responsible for the reproduction inhibiting property shared by all of the compounds employed in accordance with the present invention. This moiety is identified in the present specification by the term "triaryltin moiety." However, as known by those skilled in the art, some compounds comprising this moiety are essentially insoluble in body fluids. The identity of the radical represented by Z or by Y, which with the triaryltin moiety completes the triaryltin compound, is not critical except in that it makes the resulting triaryltin compound at least slightly soluble, and sufficiently soluble in body fluids that the compound functions in the practice of the present invention. Therefore, as the radicals, Y and Z, known solubilizing moieties are employed.

Accordingly, there is employed as monovalent solubilizing moiety (phenylloweralkyl), alkenyl, alkadienyl, cycloalkenyl, cycloalkadienyl, halo, hydroxy, mercapto, hydrogen, alkanoate, alkenoate, loweralkoxy, loweralkylthio, diloweralkylcarbamate, diloweralkylthiocarbamate, diloweralkyldithiocarbamate, radical of the formula loweralkyl

radical of the formula phenyl

radical of the formula —SnR₃. The divalent solubilizing moiety (Y) is —O—, —S—, methylene, ethylene, ethynylene,

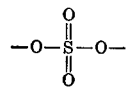

carbonyl, 1,3-butadien-1,4-ylene, or

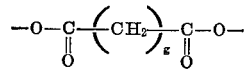

wherein g is an integer of from 1 to 10, both inclusive.

In the present specification and claims, the term "alkenyl" is employed to designate an alkenyl radical being of from 2 to 12, both inclusive, carbon atoms; the terms "cycloalkenyl" and "cycloalkadienyl" to designate respectively a cycloalkenyl and cycloalkadienyl radical being of from 5 to 6, both inclusive, carbon atoms; the terms "loweralkoxy" and "loweralkylthio" to designate respectively a loweralkoxy and loweralkylthio radical each being of from 1 to 4, both inclusive, carbon atoms; the term "alkenoate" to designate an alkenoate radical being of from 3 to 18, both inclusive, carbon atoms; the term "alkanoate" to designate an alkanoate radical being of from 2 to 18, both inclusive, carbon atoms; and the term "alkadienyl" to desigante an alkadienyl radical being of from 4 to 12, both inclusive, carbon atoms. The term "halo" is employed in the present specification and claims to designate one of bromo, chloro, fluoro, and iodo, only.

Representative monovalent solubilizing groups are benzyl (α-methylbenzyl), vinyl, allyl, 2-butenyl, 2-hexenyl, dodecenyl, cyclohexen-1-yl, 2-octenyl, decenyl, 1,3-butadienyl, cyclopentadienyl, acetate, n-butyrate, heptanoate, octenoate, stearate, laurate, oleate, 2-butenoate, 1-benzimidazolyl, 1-aziridinyl, 1-imidazolyl, chloro, bromo, fluoro, iodo, hydroxy, mercapto, hydrogen, methoxy (n-propylthio), acrylate, methacrylate, hexanoate, di-n-butylcarbamate, diethyldithiocarbamate, dimethylthiocarbamate, methylthiosulfonate, phenylthiosulfonate, and the like.

Of the foregoing, a more preferred compound is one of the formula R₃—Sn—Z in which Z is acetate, allyl or hydroxide, or one of the formula (R₃—Sn)₂ Y in which Y represents —S—. Another more preferred compound is one in which R represents phenyl. Thus, a particularly preferred compound is selected from the group consisting of triphenyltin acetate, triphenyltin hydroxide, allyltripheyltin and bis(triphenyltin) sulfide.

All of the triaryltin compounds to be employed according to the present invention are prepared according to known procedures, which may involve the use of the Grignard synthesis with reactants appropriate to prepare the sterilant agents to be employed according to the present invention. A comprehensive treatment of such procedures is found in "Organo-Metallic Compounds" (John Wiley & Sons, Inc., New York, 1960) by Coates on pages 177 to 201, inclusive, and the references therein cited. Also, numerous U.S. patents teach the preparation of the triaryltin compounds, for example, 2,631,990; 2,608,567; 2,604,483; 2,873,287 and 2,873,288.

Representative compounds to be employed according to the present invention are:

triphenyltin chloride;
triphenyltin fluoride;
cyclopentadienyltriphenyltin;
benzyltriphenyltin;
(α-methylbenzyl)triphenyltin;
triphenylvinyltin;
triphenyltin diethylthiocarbamate;
allyltriphenyltin;
2-butenyltriphenyltin;
3-butenyltriphenyltin;
(1-methylallyl)triphenyltin;
(2-methylallyl)triphenyltin;
triphenyltin acetate;
methoxytriphenyltin;
triphenyltin butyrate;
triphenyltin 10-undecenoate;
triphenyltin oleate;
triphenyltin stearate;
triphenyltin dimethyldithiocarbamate;
triphenyltin acrylate;
triphenyltin methacrylate;
triphenyltin decanoate;
triphenyltin hexanoate;
2-pentenyltriphenyltin;
triphenyltin hydride;
hexaphenylditin;
triphenyltin hydroxide;
triphenyltin diethylcarbamate;
triphenyltin mercaptide;
(1,3-butadienyl)triphenyltin;
triphenyltin bromide;
tris(p-chlorophenyl)tin acetate;
allyltris(p-fluorophenyl)tin;
tris(o-methoxyphenyl)tin fluoride;
tris(p-butoxyphenyl)vinyltin;
2-cyclohexen-1-yltriphenylthin;
2-hexenyltriphenyltin;
triphenyltin propionate;
bis(triphenyltin) oxide;
bis(triphenyltin) sulfide;
tris(2-pyridyl)tin 2-hexenoate;
tris(p-isopropylphenyl)tin acetate;
hexakis(2-pyridyl)ditin;
tris(4-methyl-2-pyridyl)tin mercaptide;
tris(4-methoxy-2-pyridyl)tin chloride;
tris(p-butoxyphenyl)tin laurate;
tris(triphenyltin) aluminate;
1-aziridinyltriphenyltin;
tris(triphenyltin) borate;
(butylthio)triphenyltin;
ethylenebis(triphenyltin);
tris(4-pyridyl)tin chloride;
tris(2-pyridyl)tin stearate;
2-butenyltris(3-pyridyl)tin;
bis(tris(4-pyridyl)tin) sulfide;
tris(3-pyridyl)tin acrylate;
cyclopentadienyltris(p-tolyl)tin;
bis(tris(p-chlorophenyl)tin) oxide;
1-imidazolyltriphenyltin;
tris(p-ethylphenyl)(1-methylallyl)tin;
1,3-butadien-1,4-ylenebis(tris(o-tolyl)tin);
tris(2-pyridyl)tin methacrylate;
benzyltris(3-pyridyl)tin;
tris(4-chloro-2-pyridyl)tin butyrate;
tris(p-chlorophenyl)ethoxytin;
tris(o-chlorophenyl)tin hydroxide;
(2-methylallyl)tris(5-chloro-3-pyridyl)tin;
1-benzimidazolyltriphenyltin;
methylenebis(triphenyltin);
ethynylenebis(triphenyltin);
carbonylbis(triphenyltin);
triphenyltin iodide;
bis(triphenyltin) sulfate;
triphenyltin methylsulfonate;
triphenyltin phenylsulfonate;
(malonyldioxy)bis(triphenyltin);
tris(p-iodophenyl)tin hydroxide.

Typically, the compounds of the present invention are crystalline solid materials of low to moderate solubility in water, ethanol, acetone, xylene and other polar and nonpolar solvents.

The process of the present invention is practiced by administering to an animal a minimal sterilant amount of at least one of the triaryltin compounds. In the present specification and claims, the term "minimal sterilant amount" is employed to designate an amount which is sub-lethal and which is without injurious effect upon the ability of the resulting sterilized animal to carry out the acts of mating. The weight of one or more of the triaryltin compounds to be administered can vary over a wide range. The preferred range takes into account numerous factors, such as, for example, the efficacy, including biological activity and molar efficacy of a particular triaryltin compound, the desired duration of the sterilizing effect, the nature, condition, and body weight of the animal, and whether the sterilization is to be effected by the administration of one dose or in multiple doses. When the administration is to be made in a single dose and the circumstances in which the invention is employed admit of weighing of the individual animal or animals, the generally effective dosage is from about 0.1 or less to about 1000 or more milligrams of triaryltin compound per kilogram of the individual animal's body weight. If desired, a sterilant amount of triaryltin compound can be administered in several portions over a period of time, such as 24 hours. However, when administration is made on a regularly recurring daily basis the daily dosage can be of from 0.1 to 50 or more milligrams per kilogram of body weight, and over a period of time up to the lifetime, or normal duration of gamic fertility of an animal.

The present method finds important application in the sterilization of economically undesirable insects. Release of large numbers of cage-reared, healthy but sterile insects has become a major means of control of such insects. The present method has many advantages over the radiation treatment now widely used. In that method, cumbersome and expensive equipment is needed.

The insects with which the method of the present invention can be practiced, employing representative compositions of the present invention, include, for example:

Among the Diptera, the housefly, mosquito, gnat, and screwworm fly;

Among the Hymenoptera, imported fire and other ants, and sawflies;

Among the Lepidoptera, the common clothes moth, gypsy moth, tussock moth and corn ear worm;

Among the Orthoptera, roaches and grasshoppers;

Among the Coleoptera, bettles, granary weevils, cotton boll weevils, the Buprestid beetles, and the Cerambycid beetles;

Among the Siphonaptera, fleas;

Among the Homoptera, leaf hoppers and white flies;

Among the Isoptera, termites; and

Among the Hemiptera, lygus bugs, chinch bugs, and bedbugs.

In general, the insects with which the present invention is most advantageously practiced are economically and esthetically objectionable insects characterized by high reproductive rates and substantial mobility of individuals.

Because of its safety and simplicity, it is contemplated that the present method will make possible the extension of such sterile-population control means very widely and perhaps universally among such lower animals or reproduce gamically.

The mammals with which the present invention can advantageously be practiced include, for example, Among the Lagomorpha, the bush rabbit of Australia, the jackrabbit of the western United States, the cottontail rabbit;

Among the Rodentia, the feral nutria of the southern United States, mice of many genera, notably Mus, Microtus and Peromyscus, rats, including notably the Norway rat, ground squirrels;

Among the Carnivora, various representatives of the Canidae, including notably feral domestic dogs and coyotes, and various Felidae, of which the most troublesome is the feral housecat.

Such mammals are those generally characterized by a high reproductive potential, considerable mobility, and economic or aesthetic disadvantages.

The birds with which the present invention can advantageously be practiced include, for example, Among the Passeriformes, the starling, the English sparrow, various of the blackbirds, the cowbird, and grackles;

Among the Piciformes, various sapsuckers which damage trees;

Among the Columbiformes, certain pigeons which are pests in heavily populated areas;

Among the Charadriiformes, occasionally, gulls and their allies.

In general, mobile birds of high reproductive potential and objectionable characteristics lend themselves to control in the present invention.

Selection of the species to be controlled is achieved in manners known to biologists and especially to those familiar with wildlife management, entomology, and similar specialized pursuits. In general, advantage is taken of differences in dietary habits, feeding loci, seasonal occurrence, body size, and the like, by such matters as kind of medicated food to be used, size of bait box aperture, location of feeding station, and the like.

The practice of the present invention is of special advantage in the population control of those animals, most typically birds (Phylum Chordata, Class Aves) and insects (Phylum Arthropoda, Class Insecta) wherein reproductive potential is high and the normal female typically stores live male gametes and, drawing upon them, produces a large number of viable zygotes, in succession. The advantage of the present invention when employed for the population control of such animals is that while the animals so treated appear to function normally as members of their population and can carry out the acts of mating on subsequent occasions, the females are incapable of producing any viable zygotes for an extended period of time.

The method of the present invention can be carried out by such known medical techniques as the oral or anal administration or force feeding, or injection into body tissue, of a sterilant dose of one or more of the unmodified triaryltin compounds. In such procedures, a triaryltin compound can be administered in gelatin capsules or microcapsules or in the form of tablets. However, the present invention also embraces means well known in veterinary medical practice such as the employment of a liquid, drench, pellet, powder, salt, mash, mixed grain ration or other animal feed composition, which may be a vitamin concentrate, containing as an active agent one or more of the triaryltin compounds. In such usage, the active agent can be modified with one or more of a plurality of cooperating substances such as additaments or innocuous ingestible adjuvants including water, ethanol, 1,2-propanediol, skimmed milk, liquid or solid surface active dispersing agents, ingestible powders and commercial animal feeds, concentrates or supplements. Such augmented compositions are adapted to be fed to animals to supply the desired dosage of active agent or to be employed as concentrates and subsequently diluted with additional carrier to produce the ultimate compositions. In such compositions the carrier cooperates with the triaryltin compound to facilitate the process of the invention and obtain an improved result.

The exact concentration of triaryltin compound to be employed in a composition can vary provided that a sufficient amount of the composition is ingested by an animal to provide the required dosage of triaryltin compound. For example, where individual administration is preferred, liquid, drench, or solid compositions containing from about 5 to 95 or more percent by weight of active agent can be employed to supply the desired dosage. Where one or more of the triaryltin compounds is provided as a constituent of the principal feed ration, the required dosage can be supplied with feed compositions containing from 0.0001 to 30 percent by weight of triaryltin compound. In compositions consisting essentially of the present chemosterilant agents and a chemical attractant, from 1 to 99.9 percent of composition can be the present chemosterilant agents and from 99 to 0.1 percent, all by weight, can be attractant. In compositions to be employed as concentrates, one or more of the triaryltin compounds can be present in a total concentration of active agent of from 5 to 98 percent by weight.

The attractants adapted to be employed in the present invention are the attractants including appetitives, conventionally known in their respective fields; for example, many insects are attracted variously to geraniol, eugenol, and extractives of bodies of insects of the species to be attracted; various mammals are attracted to beaver castor, musk, and the like. The essential oil of *Nepeta cataria* is used to attract various of the Felidae. Certain of the rodents are attracted by esters of such aliphatic acids as butyric and caproic. Other attractants are known in their various arts, such as sugar and fats.

Liquid compositions containing the desired amount of active agent can be prepared by dispersing the compound, or an organic solvent solution of the compound in water with the aid of a suitable ionic or non-ionic surface active dispersing agent such as glycerol or sorbitan esters.

The triaryltin compounds can be formed into wettable powders by grinding with an innocuous, ingestible solid such as bentonite, fuller's earth or attapulgite and a small amount of a solid wetting agent. These compositions can be administered in the form of capsules or tablets or dispersed in animal feed and such feed used to supply a part of, or the entire ration.

In the preparation of solid feed compositions, the triaryltin compounds can be mechanically ground with grain or dry feed compositions, or made up into capsules or tablets such as described above and then mixed in the feed. The feed can be given dry or with an humectant to inhibit segregation into components, or with added water to give it mush-like consistency. An animal attractant can be added to the feed or to other composition comprising one of the triaryltin compounds. Also, the compounds can be dispersed in an edible oil such as coconut or cottonseed oil, and the resulting mixture dispersed in the feed. These edible oil compositions can contain one of the aforementioned emulsifying materials as a dispersing agent.

The following examples illustrate the invention but are not to be construed as limiting.

EXAMPLE 1

Various of the triaryltin compounds are incorporated in dietetically complete feed compositions for house flies to prepare medicated feed containing 0.1 percent of one of the triaryltin compounds by weight of ultimate composition. The medicated feed, and unmodified otherwise identical feed composition, are fed as the sole ration to various separate parent groups of adult house flies (*Musca domestica*), beginning at the time of emergence from pupal cases. Each parent group of flies is composed of individuals of both sexes and is confied in a separate enclosure. Each is provided with egg-laying media within the enclosure, and the individuals permitted to feed, mate, and lay eggs under conditions conductive thereto. After a period of time normally sufficient for egg-laying, egg-hatching, and initial growth of progeny larvae, that is, a period of about eight days from the emergence from the pupal cases of the parent groups of adult flies, the enclosures are examined for progeny fly larvae. In the enclosure containing the control group of parent flies fed on the unmodified feed composition, there is found a large number of thriving progeny fly larvae. In replicate tests, in the enclosures wherein parent flies are feeding on a medicated feed there are occasionally found a very small number of progeny larvae. Usually there are found no progeny fly larvae.

The results obtained are expressed as percent sterilization. When live larvae are present in the treated medium, percent sterilization is calculated by dividing the number of larvae in the treated test by the number of larvae in the corresponding untreated test and multiplying the quotient therefrom by one hundred. As reported here, a value of 100 percent sterilization indicates that no live larvae are present in the treated medium. The results are set forth in the following table.

| Triaryltin compound in treated media: | Percent of sterilization |
|---|---|
| Cyclopentadienyltriphenyltin | 100 |
| Triphenylvinyltin | 100 |
| 2-butenyltriphenyltin | 100 |
| Triphenyltin acetate | 100 |
| Benzyltriphenyltin | 100 |
| Allyltriphenyltin | 100 |
| (2-methylallyl)triphenyltin | 100 |
| Triphenyltin stearate | 100 |
| Hexaphenylditin | 100 |
| Tris(triphenyltin) borate | 100 |
| Tris(p-chlorophenyl)tin chloride | 90 |

Observations are made throughout the course of the test on various parent groups of flies feeding on the medicated feed. The adult progenitor flies are uniformly alive and in apparently good health. The mortality in the parent groups treated with steriliant amounts of the present agents is very small and normal; that is, it does not exceed the mortality of the untreated parent group. Upon microscopic necropsy as well as live examination of the treated adult progenitor flies, visible abnormality is confined to the ovaries of females: these exhibit immature eggs in various stages of arrested development.

EXAMPLE 2

In further operation various other of the triaryltin compounds are employed as described in Example 1 for the sterilization of flies. The compounds are incorporated in the dietetically complete feed composition to obtain medicated feed containing, by weight of resulting composition, 0.012 percent of one of the following triaryltin compounds: 2-butenyltriphenyltin, 1-methylallyltriphenyltin, triphenyltin acetate, triphenyltin 10-undecenoate, triphenyltin dimethyldithiocarbamate and triphenyltin acrylate. The procedures employed are as set forth in Example 1.

There is observed a 100 percent sterilization of each of the parent groups of flies feeding on one of the medicated feeds, there being no progeny larvae. The control group supports a large number of larvae. Mortality in all groups is very small and normal.

EXAMPLE 3

Allyltriphenyltin is incorporated in a dietetically complete mouse feed composition to prepare a medicated feed containing 0.006 percent of the allyltriphenyltin by weight of ultimate composition. The medicated feed and unmodified, otherwise identical feed composition, are severally fed as the sole ration to separate parent groups of standard laboratory white mice, the medicated feed to a Group A, the unmodified feed to a Group B. Each parent group of mice consists of ten female mice and three male mice; all of the mice are young, sexually mature, vigorous and in apparently good health.

At the beginning of the test period, each parent group of mice is segregated by sex, the female mice in one enclosure, the male mice in another enclosure. The segregated mice are fed on the respective feeds as indicated above for three days whereupon the separation of the sexes is discontinued, both sexes of each parent group being placed together in a single enclosure. The parent groups of mice are permitted to continue to feed on the medicated feed and unmodified feed composition, respectively, and to breed, under conditions conducive thereto. After a period of time normally sufficient for breeding, that is, about two and one half weeks, the sexes are again separated and each female is placed in a separate enclosure. Shortly thereafter, two, approximately the number typically expected after this interval of time and under such controlled conditions, of the females of Group B bear young. None of the females of Group A bears young. The mice of Group A appear to be somewhat heavier than those of Group B, but in all other respects, normal. There is observed no adnormality in the Group A mice of either sex. All of the female mice of Group A are sacrificed and none is found to be carrying young.

EXAMPLE 4

Allyltriphenyltin is incorporated in a dietetically, complete feed composition for Japanese quail (*Coturnix japonica*) and employed for the sterilization thereof. The medicated feed composition thus prepared contains 0.025 percent of allyltriphenyltin by weight of ultimate composition. The medicated feed and unmodified otherwise identical feed composition are fed as sole ration to groups of adult female quail, the medicated feed to a Group A, the unmodified feed to a Group B. Each group of the quail is confined in a separate enclosure for an evaluation period of ten days under conditions conducive to the life processes, including mating and egg-laying, of the quail. The groups of quail are observed to determine the number of eggs produced daily by each. The results observed are as set forth in the following table.

|  | Number of eggs laid | |
| --- | --- | --- |
|  | Group A | Group B |
| Day of evaluation period: |  |  |
| 1 | 7 | 7 |
| 2 | 5 | 6 |
| 3 | 1 | 8 |
| 4 | 1 | 8 |
| 5 | 0 | 9 |
| 6 | 0 | 1 (6) |
| 7 | 0 | 3 |
| 8 | 0 | 5 |
| 9 | 0 | 4 |
| 10 | 0 | 5 |
| Total | 14 | 61 |

1 Control group diminished in size by death of 1 quail.

After the evaluation period, the feeding of the medicated composition is discontinued and Group A is thereafter fed an unmodified feed composition and observed further to determine daily egg production. Throughout this period of time, Group B is maintained on the unmodified feed composition. Following the date on which the medicated feeding is discontinued, the quail of Group A begin again to lay eggs, in increasing numbers, so that by about 13 days after that date, the number of eggs produced is not substantially different from the number of eggs produced by the quail of the control group.

EXAMPLE 5

To the unmodified feed composition for quail, as employed in Example 4, allyltriphenyltin is added in an amount of 0.0062 percent by weight of resulting composition. The resulting medicated feed composition and unmodified otherwise identical feed composition are fed as sole ration to groups of equal numbers of mated adult female quail as nearly alike as possible as to age, weight, history, and similar factors. The medicated feed is employed as sole diet of a Group A; the unmodified feed, of a Group B. Each group of the quail is maintained in a separate enclosure under conditions conducive to the life processes, including egg-laying of the quail. Beginning on the third day after the initiation of the feeding, and continuing for a nine day evaluation period through the eleventh day after the initiation of the feeding, all eggs laid by the quail of both groups are collected, the eggs from each group being kept separate.

The eggs are collected and thereafter maintained and incubated under conditions conducive to their hatching. The total number of eggs produced through the nine days of the evaluation period and the number of such eggs which hatch are determined for each group of quail. The results observed are expressed in the table below.

|  | Group A | Group B |
| --- | --- | --- |
| Total number of eggs produced | 56 | 100 |
| Number of eggs hatching | 2 | 56 |

The chicks hatching from the two hatched eggs from treated females are in all evident ways normal.

EXAMPLE 6

Product of the present invention is employed for the sterilization of confused flour beetle (*Tribolium confusum*). Specifically, allyltriphenyltin is dispersed in wheat flour to prepare a medicated flour feed containing 0.01 percent of compound by weight of resulting medicated feed. Groups of pupae about to emerge as adults are placed in containers, one group being supplied therewithin with the medicated flour as sole feed ration, another group being provided with unmodified flour as sole feed ration. Adults emerge from the pupal cases and the groups of beetles are maintained for about eight weeks under conditions conducive to their living processes and reproduction.

Thereafter, the containers are examined to determine the condition of the adult beetles and ascertain whether there are any larvae and/or progeny pupae. In both medicated and unmedicated flour, the adults are normal in appearance and health, mortality being no greater than normal in each. However, in the medicated flour, there are neither live larvae nor progeny pupae whereas in the unmedicated flour, there are live larvae and live progeny pupae, each about as numerous as the adults.

EXAMPLE 7

Triphenyltin hydroxide is applied to fresh leaves of young plants to prepare a medicated feed for *Melanoplus femur-rubrum* (Orthoptera) containing 0.1 percent by weight of ultimate composition. The medicated feed and unmodified, otherwise identical feed composition, are severally fed as sole ration to separate confined young adult populations of said insect, the medicated feed to a Group A, the unmodified feed to a Group B. The insects are maintained under cage conditions otherwise suitable for their growth and reproduction. After two weeks, sod is supplied for oviposition.

After a period of time normally sufficient for mating and oviposition, the grasshoppers are removed and the sods maintained for hatching. From the sod from the cage of unmedicated insects there emerge numerous nymphal grasshoppers. From the sod from the cage of medicated insects there emerge no grasshopper nymphs. Adults of both groups appear normal and of unimpaired vigor throughout the test.

EXAMPLE 8

Boxes of earth are provided as culture media for two colonies of earthworms (*Lumbricus terrestris*). The earth is a rich loam, containing abundant humus from decaying hardwood leaves. It is steam sterilized and inoculated with a single adult earthworm near to time to cast its reproductive cocoon. The earth is enriched in worm nutrient content by thoroughly mixing thereinto yellow cornmeal. In one of the culture media, hereinafter called "A," In the other, hereinafter called "B," the cornmeal is modified by admixture thereinto of finely divided bis(triphenyltin)sulfide in an amount sufficient to supply 500 parts thereof per million parts by weight of cornmeal. This represents between 5 and 10 parts of the tin compound by weight of soil with modified cornmeal added thereto.

The resulting cultures are then maintained under favorable growing conditions, and examined periodically. In each the adult earthworm timely casts its reproductive cocoon, in each the cocoon produces young worms. They grow normally to adulthood. In each culture the resulting adult worms mate normally, in the dark. Subsequently, reresentative egg cocoons from each culture are removed and separately maintained under favorable growing conditions. After two months, none of the cocoons produced from worms of the treated culture B has produced live young. The production of live young from the cocoons of culture A is normal in all respects.

EXAMPLE 9

Two pair of house cats, each pair consisting of one male and one female, all thirty days old, are fed a commercial "cat food" diet consisting essentially of fish scraps, cereal, a general vitamin and mineral supplement in such amounts as they will eat, cows' milk, occasionally cooked green peas, and water: in one pair of cats the diet is modified by the addition, to the commercial cat food, as a dust, of allyltriphenyltin in weight of approximately three hundred parts per million parts of total diet. The animals are maintained on this diet, exclusively, for approximately a year.

At approximately 200 days age, the pairs mate. Sixty-one days after mating, the female of the pair having the unmodied diet gives birth to a litter of four normal young.

The female of the pair fed the diet modified as indicated gains moderately in weight, but not so much as the gravid female just prior to delivery of young; the former produces no young.

EXAMPLE 10

In procedures essentially the same as the foregoing, tris(triphenyltin) borate is tested as a systemic sterilant upon cats; the procedures being varied in that the said tin compound is omitted from the diet but administered once each week as an intraperitoneal injection of a sesame seed oil suspension of micro-fine crystals of the said compound. Injection is carried out with the cats under light nembutal anaesthesia, and through a slack fold of gathered skin to assure that no internal organ be perforated. The weekly injection is calculated to supply to each cat an amount of the compound between 100 and 120 milligrams of the compound per kilogram body weight. Untreated cats are similarly injected with sesame seed oil only.

The untreated cats reproduce normally. The treated cats produce no young. The treated female gains weight as noted on the treated female of the previous example.

EXAMPLE 11

Procedure essentially the same as the foregoing are repeated except that the employed tin compound is triphenyltin chloride and the mode of application is per rectal enema in cottonseed oil. Substantial quantities of the medication are voided almost immediately; consequently the administered amount is increased to 250 milligrams per kilogram body weight, of which an undetermined amount is retained.

Results are essentially the same as the foregoing; the greated pair produce no young, the untreated reproduce normally. The treated female gains weight but shows no other peculiarities.

EXAMPLE 12

Procedures essentially the same as the foregoing are repeated employing dogs as the test animals. The proportion of the oil enema retained being apparently somewhat greater, the concentration is reduced so as to supply a total of 200 milligrams per kilogram body weight of which an undetermined amount is retained.

The treated female does not reproduce; the untreated one brings forth a litter of three pups.

EXAMPLE 13

In each of a first and second aquarium of brackish water (essentially three parts fresh brook water and one part natural sea water) containing microflora and microfauna representative of tidal brook water, and provided with a bottom of sand, gravel, mud, and vegetation from a tidal brook, there are maintained a pair of adult stickleback fishes, probably *Eucalia inconstans* under generally favorable conditions. To the water of the first aquarium is added tris(4-butylcyclohexyl)tin dodecanoate in amount sufficient that the water of the aquarium contains the said tin compound in the amount of 0.1 part per million parts by weight of treated water. The tin compound is added in the form of an acetone solution.

The water of the second aquarium is modified only by the addition of acetone in the amount used in the first aquarium as tin compound solvent.

The fish are maintained thus, regularly fed, their water mechanically aerated, and otherwise given necessary attention, for a period of several months under observation. The males build the nests typical of the stickleback; the females oviposit. It is assumed but not observed that the males fertilize the eggs routinely.

Three weeks thereafter the water of the second aquarium supports a large population of stickleback fry which grow normally. Mortality from cannibalism runs high.

The water of the first aquarium is carefully seined and found to contain no fry. The adult sticklebacks appear to be normal in all respects. The nest is recovered and studied. No definable eggs appear therein although decomposing organic matter that might have been eggs is found.

EXAMPLE 14

Two pairs of hamsters, each pair consisting of one male and one female, all twenty days old, are fed a diet consisting essentially of lettuce in such amounts as they will eat, dog biscuit moistened with cows' milk, cracked yellow corn, and water: in one pair of hamsters the diet is modified by the addition, as a dust, of tris(p-tolyl)tin chloride in weight of approximately five hundred parts per million parts of total diet. The animals are maintained on this diet, exclusively, for approximately a hundred days.

At 44 and 45 days age, the pairs mate. By age 60 days, the female of the pair having the unmodified diet gives birth to a litter of fourteen young, of which one dies a few hours following birth but the others grow normally. At age 92 days this same female gives birth to a second litter of twelve young of which all live.

The female of the pair fed the diet modified as indicated gains moderately in weight, but not so much as the gravid female just prior to delivery of either litter; but produces no young.

EXAMPLE 15

The present invention is especially adapted to control of fertility among ruminant mammals because of their custom of seeking out sources of salt to "lick"; however, control of such mammals will seldom be of economic interest. The feasibility of the method is established experimentally thus:

In two fenced enclosures of 160 acres each, of slash hardwood forest predominantly young shoots of regrowth from the roots of trees of the genus Populus harvested for paper pulp, there are maintained selected and closely comparable monoandrous herds of Virginia white-tailed deer (*Odocoileus virginiana*) each consisting of a buck and two does, all mature and in good health. The biota within the enclosure are sufficient to maintain the herds in good condition indefinitely.

In each enclosure a salt block is provided atop a stake, at a height and in a location convenient for the deer. The salt blocks are alike except that in one of the enclosures the salt contains two percent bis(triphenyltin)oxide by weight of total medicated salt. Access to the salt is ad libitum, and blocks are replaced with like others as soon as they are exhausted or nearly so.

The animals are first confined in the enclosures in early October and are maintained under observation for 18 months, being released in March of the second following year.

In June after beginning of the study, the does of the group fed unmedicated salt drop two fawns, believed but not known to be one each; the other group produces no progeny.

Beginning in February of the second year the herds are observed from a treetop blind near to but outside the enclosures, with the aid of binoculars. The does of the herd fed unmedicated salt appear to be gravid: those of the group fed medicated salt appear heavier than unconfined does in the area.

One of the does of the group given medicated salt is shot, from the blind, and examined. She is not with fawn.

EXAMPLE 16

An area of open agricultural land, having two colonies of Imported Fire Ant (*Solenopsis saevissima*) isolated by ten miles distance from the nearest known infestation of the insect, constituting a natural exclosure, is baited with peanut oil mean mash, medicated by the inclusion thereinto of 0.1 percent 2-methylallyltriphenyl tin, and packed into 3 inch lengths of plastic drinking straws. Bait is distributed adjacent the anthills and craters, and along and adjacent to the runways known to be used by the ants. The supply of bait is replenished from time to time. The colonies are closely observed.

Baiting begins in early summer and continues for a little more than a year. By late summer, further increase in size of the colony is not noted. Apparent size of the colonies, as indicated by numbers of emerging ants, size of hills, and other evidence visible from the surface, does not increase further.

The following spring, numbers of workers on feeding forays appear sharpy diminished. One of the colonies appears to be abandoned by late May, the other in July.

EXAMPLE 17

Sweet milk dipping chocolate, essentially sugar, chocolate, milk solids, emulsifier and appetitive attractants including vanillin, ethylvanillin and methyl anthranilate, is medicated by adding thereto 100 parts allyltriphenyl tin during the final milling process in manufacture of the chocolate. The tin compound is uniformly distributed throughout the chocolate which is thereafter poured into block molds and permitted to harden.

The hardened chocolate is distributed in locations frequented by ants of both sweet-eating and fat-eating types, believed but not conclusively determined both to be of the genus Solenopsis.

Ants quickly find the chocolate and workers visit it repeatedly, carrying portions thereof to their colonies. Their activities are closely observed at regular intervals, and approximate populations observed.

For the first four months, no apparent change in ant numbers is observed. Thereafter, the population, as represented by numbers of workers visiting the chocolate, declines. At the end of a year no ants are observed. There is no evidence of direct kill of workers or other ants eating the chocolate.

EXAMPLE 18

The present example represents essentially a repetition of the foregoing except that the medicated candy is a soft fondant consisting essentially of fine crystals of sucrose in a saturated sucrose solution, and the attractant is essentially benzaldehyde.

Sweet eating ants are attracted and population decline is essentially the same as hereinbefore noted, Example 17.

I claim:

1. Method useful in controlling population growth which comprises administering to an insect a minimal sterilant amount of a triaryltin compound selected from the group consisting of $$R_3\text{—Sn—Z}$$

and $$(R_3\text{—Sn})_2 Y$$

wherein, in all of its occurrences in any given triaryltin compound, R represents the same member selected from the group consisting of phenyl, mono-substituted phenyl wherein the substituent is a member selected from the group consisting of halo, loweralkyl, and loweralkoxy; Z represents a monovalent moiety selected from the group consisting of (phenylloweralkyl), alkenyl, alkadienyl, cycloalkenyl, cycloalkadienyl, halo, hydroxy, mercapto, hydrogen, alkanoate, alkenoate, loweralkoxy, loweralkylthio, diloweralkylcarbamate, diloweralkylthiocarbamate, diloweralkyldithiocarbamate, radical of the formula

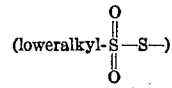

radical of the formula

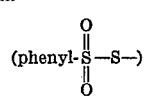

radical of the formula —Sn—R$_3$; and Y represents a divalent moiety selected from the group consisting of —O—, —S—, methylene, ethylene, ethynylene,

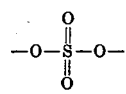

carbonyl, 1,3-butadiene-1,4-ylene, and

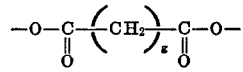

wherein g is an integer of from 1 to 10, both inclusive.

2. Method of claim 1 wherein the administration is oral.

3. Method claim 1 wherein the triaryltin compound is 2-butenyltriphenyltin.

4. Method of claim 1 wherein the triaryltin compound is triphenyltin acetate.

5. Method of claim 1 wherein the triaryltin compound is allyltriphenyltin.

6. Method of claim 1 wherein the triaryltin compound is hexaphenylditin.

7. Method of claim 1 wherein the triaryltin compound is tris(p-chlorophenyl)tin chloride.

8. Method of claim 1 wherein the triaryltin compound is bis(triphenyltin)oxide.

9. Method of claim 1 wherein the triaryltin compound is triphenyltin hydroxide.

10. Method of claim 1 wherein the triaryltin compound is bis(triphenyltin)sulfide.

11. Method of controlling the population of a species of insect wherein the normal female typically stores live male gametes and, drawing upon them, produces a large number of viable zygotes, in succession, which comprises administering to an individual of the species a minimal sterilant amount of a triaryltin compound and thereafter permitting the resulting sterilized individual to carry out the acts of mating with another individual of the species, said triaryltin compound being selected from the group consisting of $$R_3\text{—Sn—Z}$$

and $$(R_3\text{—Sn})_2 Y$$

wherein, in all of its occurrences in any given triaryltin compound, R represents the same member selected from the group consisting of phenyl, mono-substituted phenyl wherein the substituent is a member selected from the group consisting of halo, loweralkyl, and loweralkoxy;

Z represents a monovalent moiety selected from the group consisting of (phenylloweralkyl), alkenyl, alkadienyl, cycloalkenyl, cycloalkadienyl, halo, hydroxy, mercapto, hydrogen, alkanoate, alkenoate, loweralkoxy, loweralkylthio, diloweralkylcarbamate, diloweralkylthiocarbamate, diloweralkyldithiocarbamate, radical of the formula

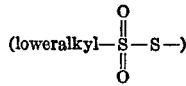

radical of the formula

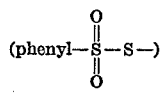

radical of the formula —Sn—R₃; and Y represents a divalent moiety selected from the group consisting of —O—, —S—, methylene, ethylene, ethynylene,

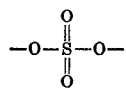

carbonyl, 1,3-butadien-1,4-ylene, and

wherein g is an integer of from 1 to 10, both inclusive.

12. Method of claim 11 wherein the administration is oral.

13. Method of claim 11 wherein the triaryltin compound is triphenyltin hydroxide.

14. Method of claim 11 wherein the triaryltin compound is bis(triphenyltin) sulfide.

15. Method of claim 11 wherein the triaryltin compound is allyltriphenyltin.

16. Method of claim 11 wherein the triaryltin compound is triphenyltin acetate.

17. A method of controlling undesirable insect population growth which comprises feeding to said insect a chemosterilant amount of a compound selected from the group consisting of triphenyltin hydroxide; triphenyltin halides; and triphenyltin esters selected from the group consisting of triphenyltin N,N'-dimethyl-dithiocarbamate, triphenyltin acetate, triphenyltin propionate, triphenyltin butyrate, triphenyltin stearate, triphenyltin acrylate and triphenyltin oleate.

18. A method in accordance with claim 17 wherein the triphenyltin ester is triphenyltin chloride.

19. A method in accordance with claim 17 wherein the triphenyltin ester is triphenyltin acetate.

20. A method in accordance with claim 17 wherein the chemosterilant is triphenyltin hydroxide.

21. A method in accordance with claim 17 wherein the triphenyltin ester is triphenyltin N,N'-dimethyldithiocarbamate.

22. A method in accordance with claim 17 wherein the triphenyltin chemosterilant is incorporated in a feed-bait carrier.

23. A method in accordance with claim 22 wherein the concentration of the chemosterilant is in the range of from about 0.004 to about 0.06 percent by weight of the carrier.

24. A method in accordance with claim 17 wherein the chemosterilant is fed to the insect in the form of a solution.

25. A method in accordance with claim 17 wherein the chemosterilant is fed to the insect in the form of a solid.

References Cited

UNITED STATES PATENTS

| | | | |
|---|---|---|---|
| 3,159,531 | 12/1964 | Bruckner et al. | 424—288 |
| 3,222,158 | 12/1965 | Sowa | 424—288 |
| 3,226,292 | 12/1965 | Shaver | 424—288 |

OTHER REFERENCES

Insect Chemosterilants, Borkoves, vol. VII of Advances in Pest Control Research, pp. 61–63 (1966).

STANLEY J. FRIEDMAN, Primary Examiner

U.S. Cl. X.R.

424—131, 148, 154, 185, 245

PO-1050
(5/69)

UNITED STATES PATENT OFFICE
CERTIFICATE OF CORRECTION

Patent No. 3,577,548              Dated  4 May 1971

Inventor(s)   Eugene E. Kenaga

It is certified that error appears in the above-identified patent and that said Letters Patent are hereby corrected as shown below:

In column 10, line 64, insert the following after "A",
-- the cornmeal is unmodified. --

Signed and sealed this 28th day of September 1971.

(SEAL)
Attest:

EDWARD M. FLETCHER, JR.           ROBERT GOTTSCHALK
Attesting Officer                 Acting Commissioner of Patents